No. 758,876. PATENTED MAY 3, 1904.
P. TREPANIER.
BRISTLE COMBING MACHINE.
APPLICATION FILED JUNE 1, 1903.
NO MODEL. 6 SHEETS—SHEET 1.
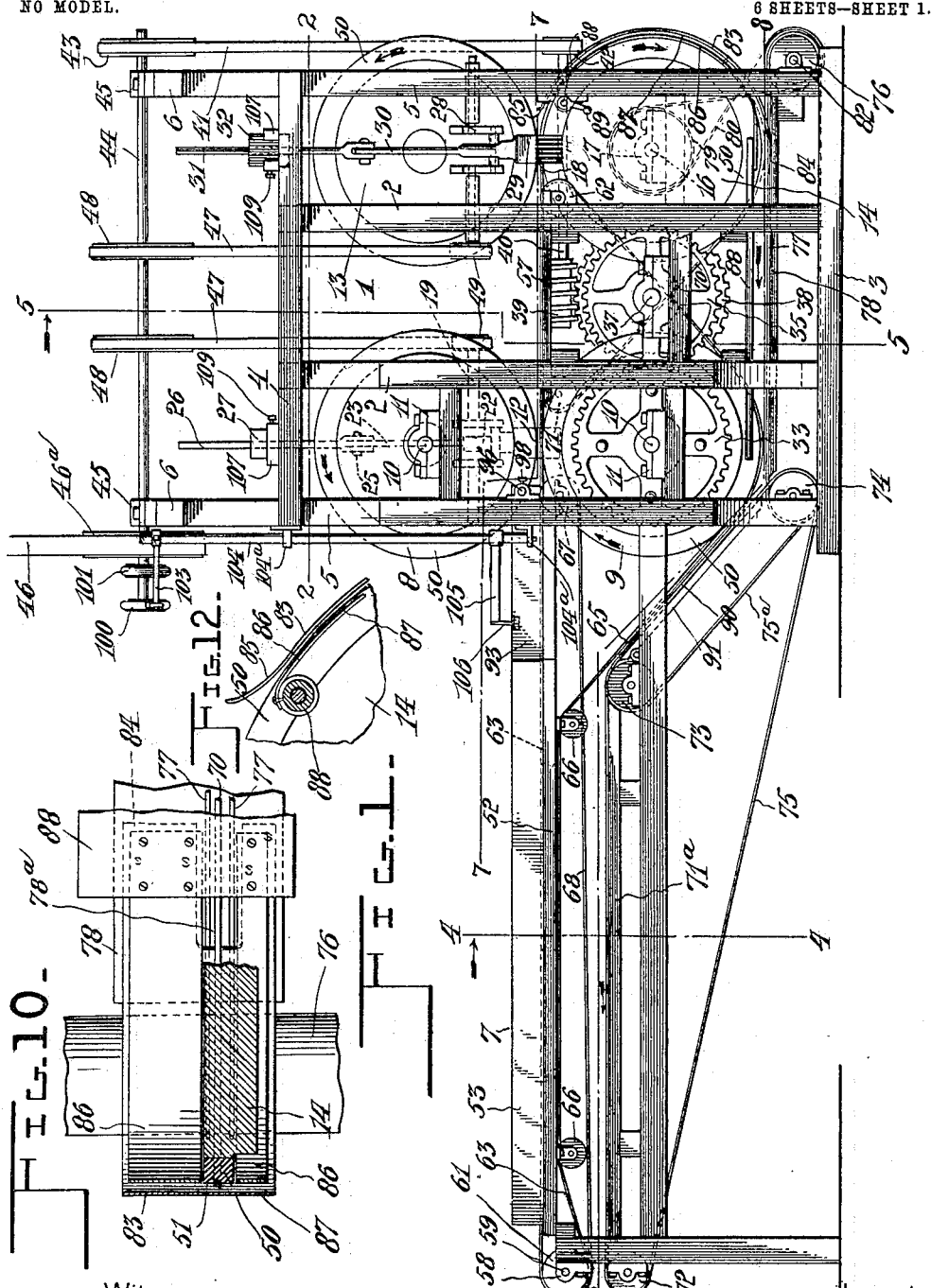
Witnesses:
Inventor,
Pierre Trepanier,
By Marion & Marion,
Attorneys

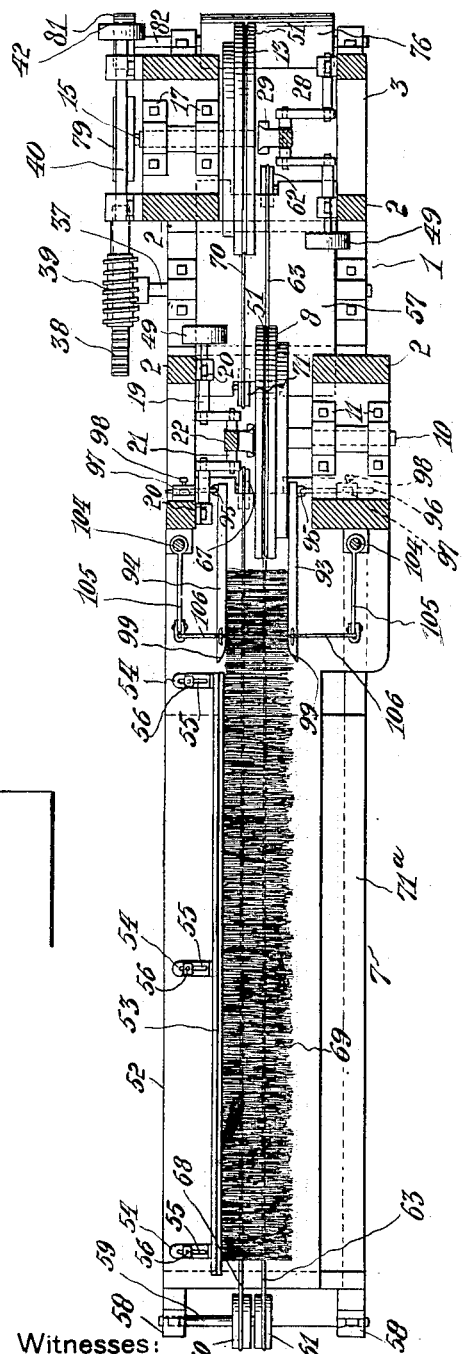
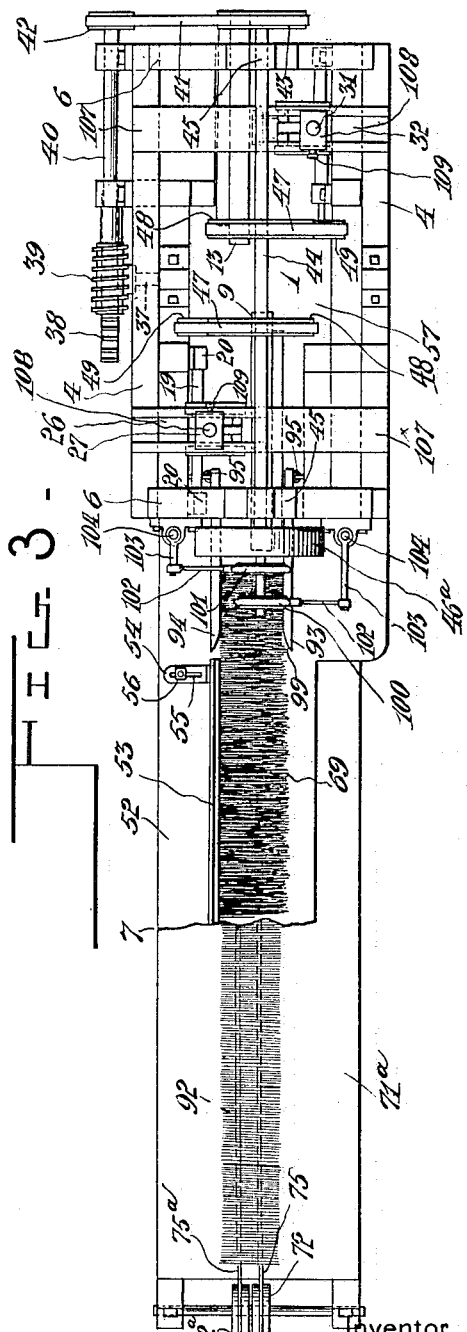

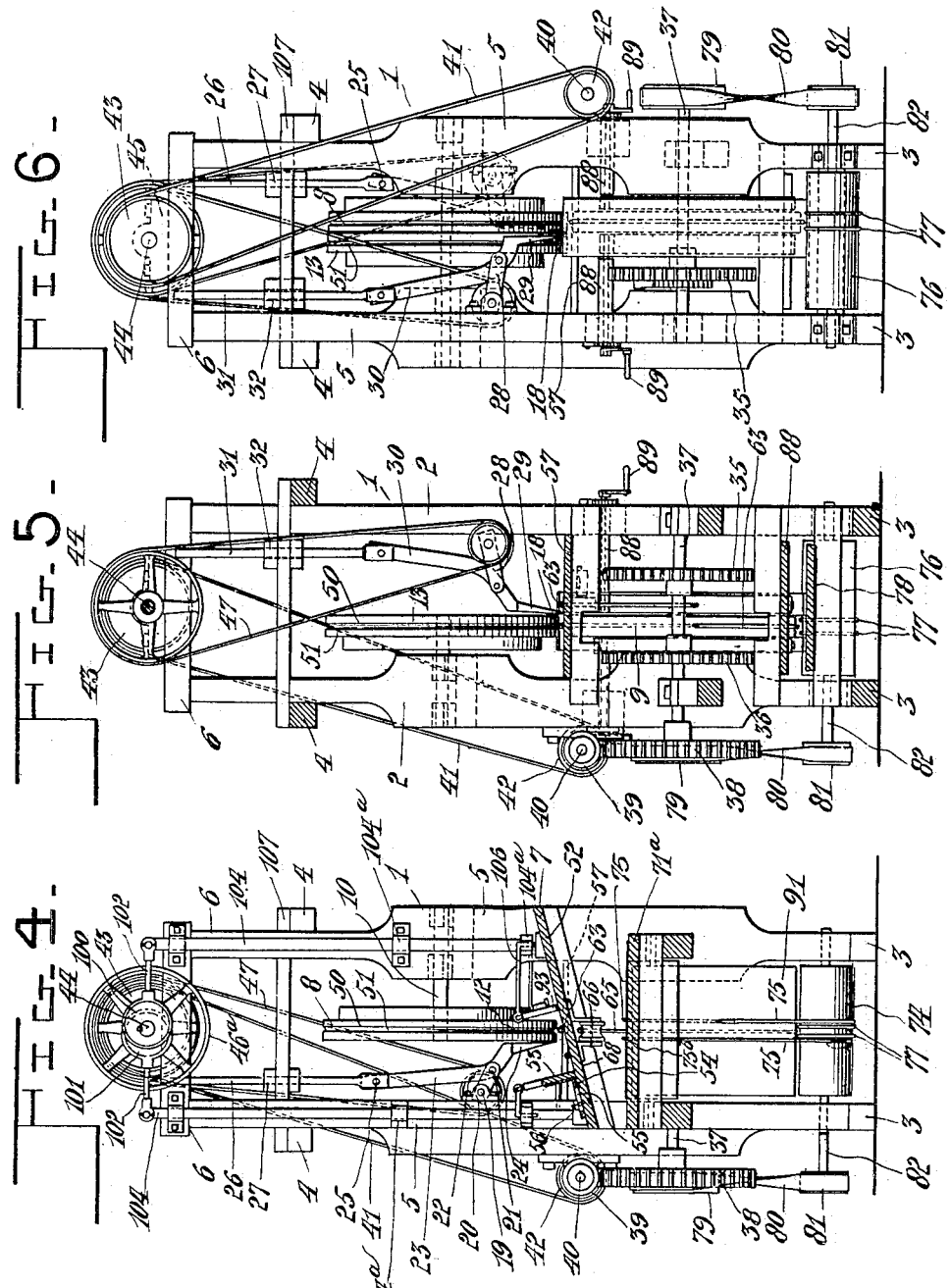

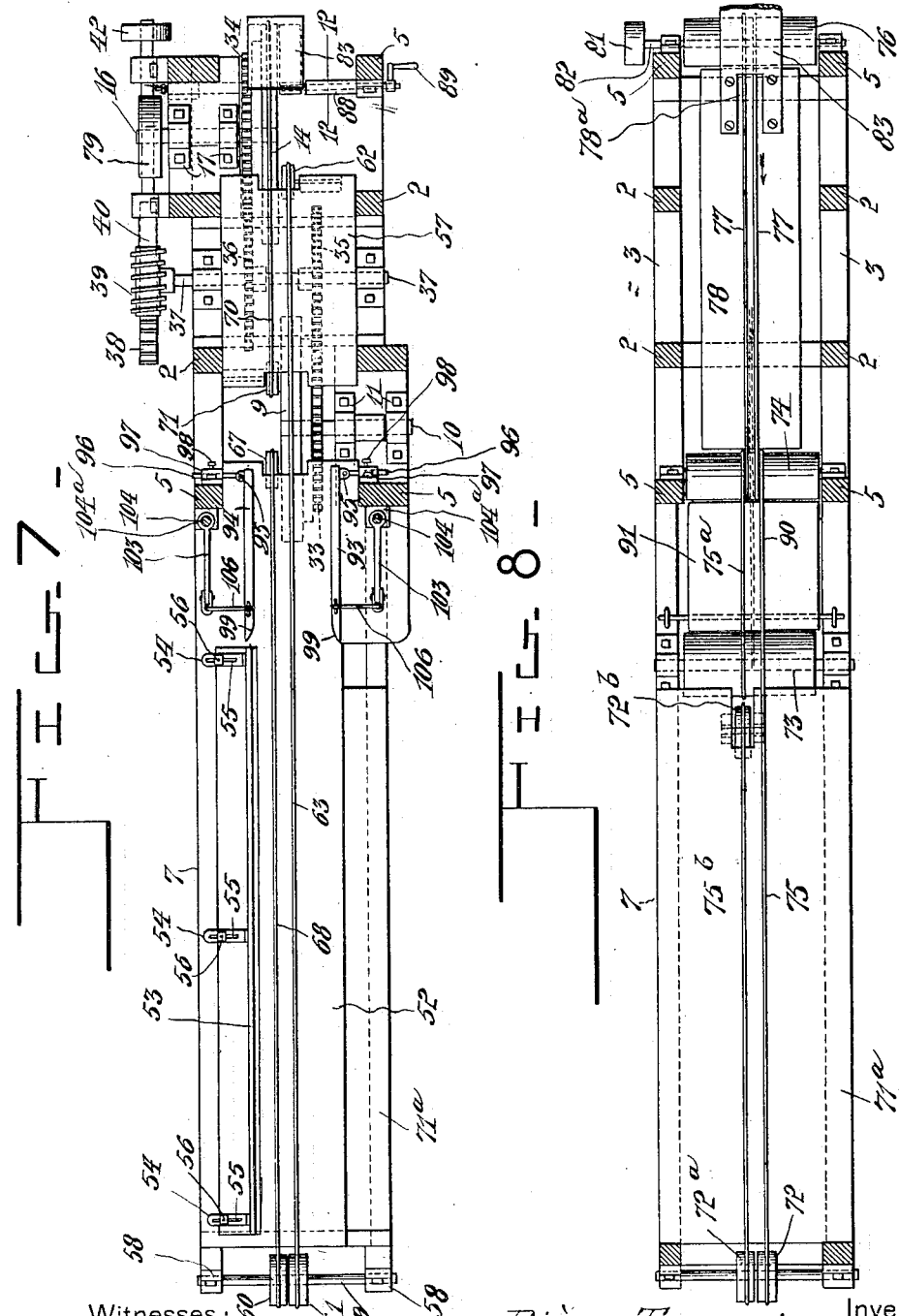

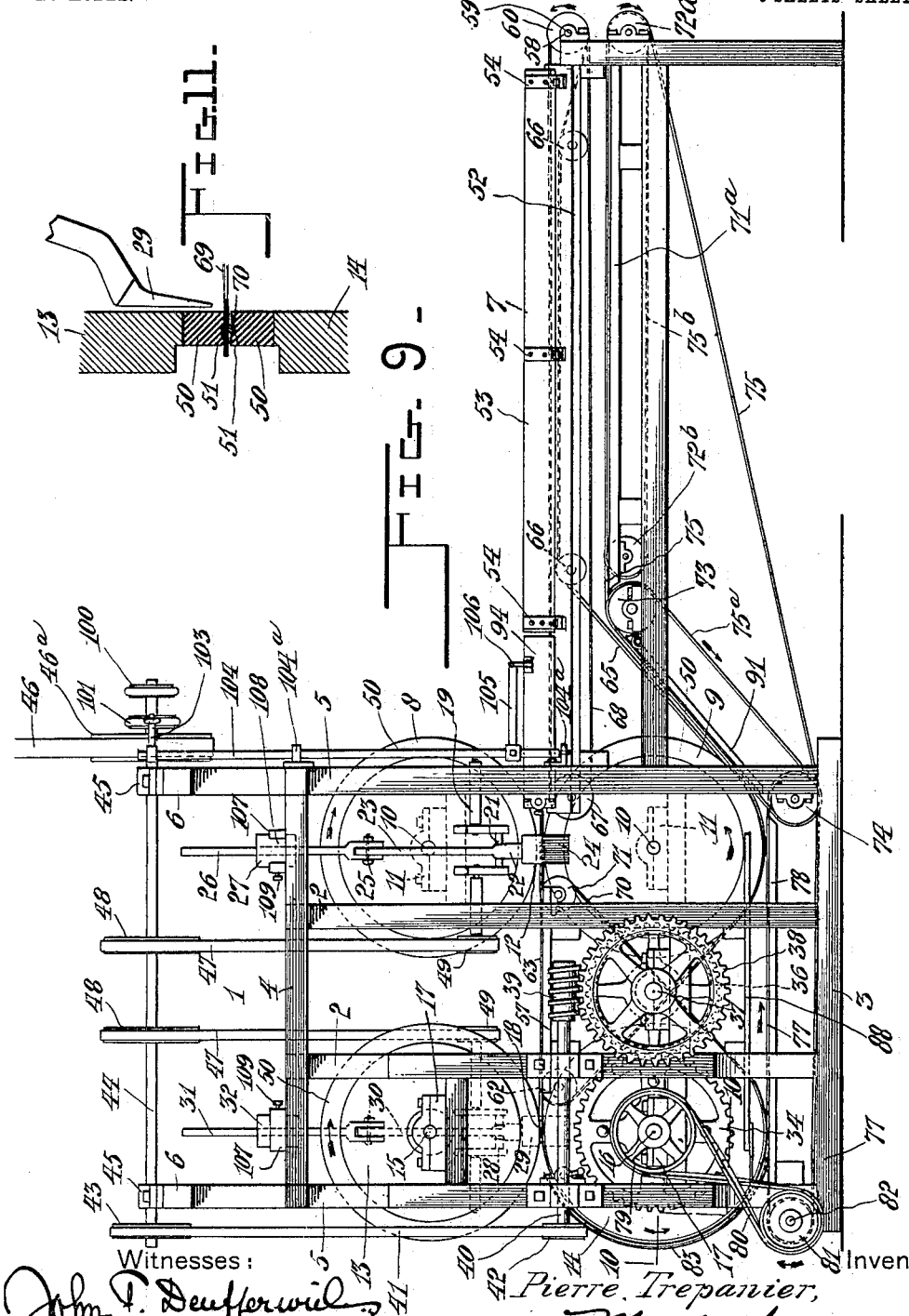

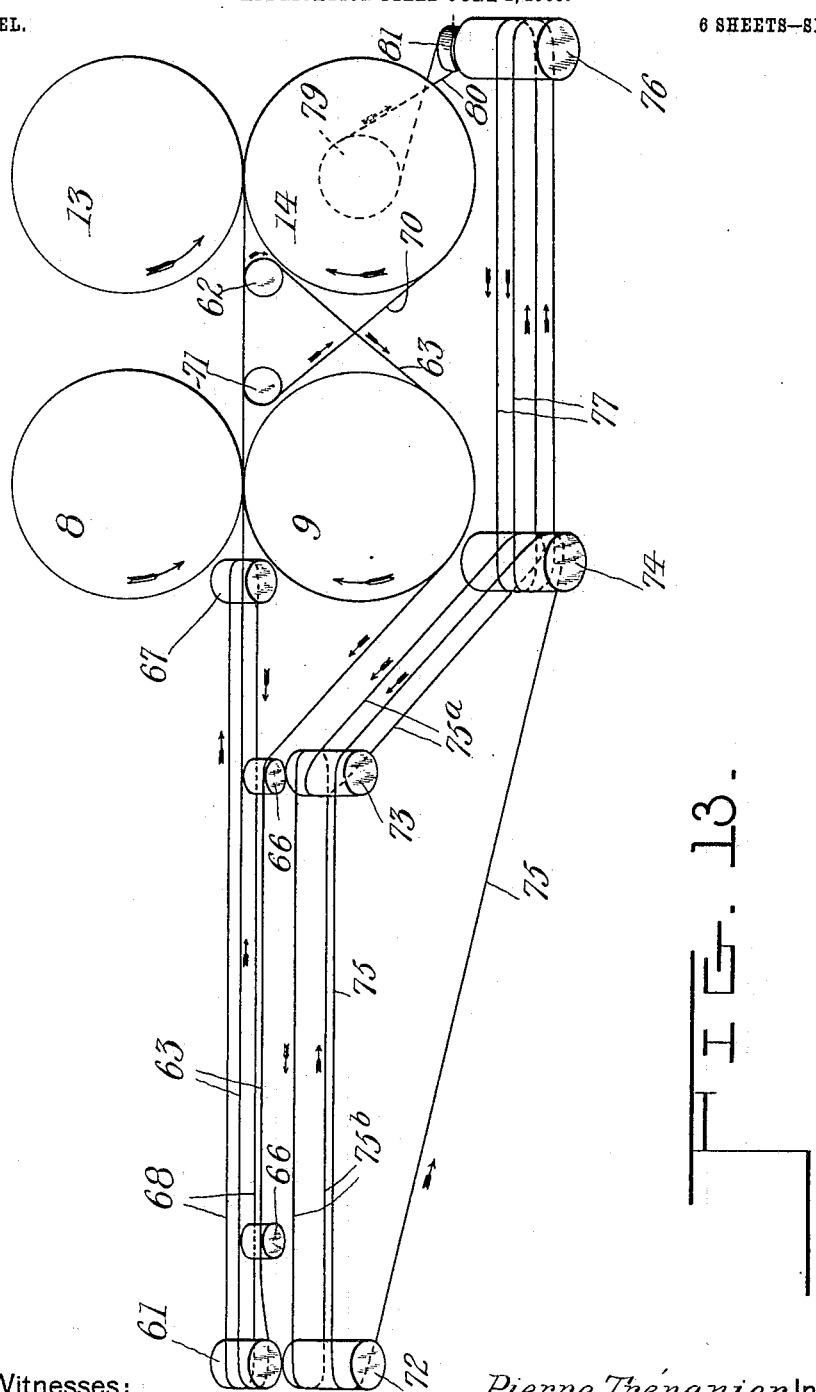

No. 758,876. Patented May 3, 1904.

UNITED STATES PATENT OFFICE.

PIERRE TREPANIER, OF BURLINGTON, VERMONT.

BRISTLE-COMBING MACHINE.

SPECIFICATION forming part of Letters Patent No. 758,876, dated May 3, 1904.

Application filed June 1, 1903. Serial No. 159,516. (No model.)

*To all whom it may concern:*

Be it known that I, PIERRE TREPANIER, a citizen of the United States of America, residing at the city of Burlington, county of Chittenden, State of Vermont, have invented certain new and useful Improvements in Bristle-Combing Machines; and I do hereby declare that the following is a full, clear, and exact description of the invention, such as will enable others skilled in the art to which it appertains to make and use the same.

My invention relates to the manufacture of brushes, such as paint-brushes, whitewash-brushes, and similar brushes which are made of bristles. The object of the invention is to arrange or comb a mat of bristles so that their ends are substantially together and their bodies disposed in substantially the same direction.

In its general construction the invention comprises an arrangement for advancing or feeding a quantity of bristles toward the combing apparatus while the said bristles are subjected to a certain shuffling action which tends to bring their ends into alinement, and subsequently the bristles pass between members which clamp them at one end, and while clamped in this manner they are subjected to the action of a comb. This operation is repeated, the bristles being held at their opposite extremities, with the result that the mat of bristles is eventually nicely arranged, the individual bristles lying in the same direction, all tangles and irregularities in their disposition having been removed. Treating the bristles in this manner has the effect also of mixing them to a certain extent as to color, because the members constituting tufts of white or black bristles become separated during the combing operation, so that the resulting collection of bristles is composed of members of different colors dispersed indiscriminately through the mat.

The invention consists in the construction and combination of parts to be more fully described hereinafter and definitely set forth in the claims.

In the drawings, which fully illustrate my invention, Figure 1 is a side elevation. Fig. 2 is a section taken substantially on the line 2 2 of Fig. 1. Fig. 3 is a plan, a portion being broken away, as will appear. Fig. 4 is a vertical section taken substantially on the line 4 4 of Fig. 1. Fig. 5 is a section taken substantially on the line 5 5 of Fig. 1. Fig. 6 is a rear elevation of the machine. Fig. 7 is a section taken substantially on the line 7 7 of Fig. 1. Fig. 8 is a section taken substantially on the line 8 8 of Fig. 1. Fig. 9 is an elevation showing the side opposite to that shown in Fig. 1. Fig. 10 is a section upon an enlarged scale, supposed to be taken on the line 10 10 of Fig. 9. Fig. 11 is a vertical section illustrating how the bristles are held when being combed. Fig. 12 is a vertical cross-section upon an enlarged scale, taken substantially on the line 12 12 of Fig. 7. Fig. 13 is a diagrammatic view of the nature of a perspective, illustrating the arrangement of the conveying means for the bristles.

Throughout the drawings and specification the same numerals of reference indicate like parts.

Referring more particularly to the parts, 1 represents the frame of the machine upon which the principal portion of the mechanism is mounted. This frame comprises a plurality of oppositely-disposed vertical members or scantlings 2, which are suitably stepped in the bottom sills 3, and to which are attached above the upper sills 4. These upper sills 4 are oppositely disposed, and it should appear that the corner members 5 of the uprights or scantlings extend upwardly above these sills, as indicated at 6. It should be stated that that portion of the frame which has just been described affords means for supporting the principal portion of the mechanism. Arrangement is made for receiving and advancing the bristles in subjecting the same to the operation of the mechanism. The arrangement for this purpose comprises a table 7, which is disposed laterally with respect to the frame, as shown. The construction of this table and its relation to the mechanism of the apparatus will be more fully described hereinafter.

Upon the frame 1 there are mounted a pair of wheels 8 and 9, respectively, in the manner shown, the same being carried upon axles 10, suitably mounted in bearings 11. It should be observed that these wheels are disposed in a plane extending in the same direction as the table 7, aforesaid, and it should also appear that the wheel 8 is disposed substantially vertically above the wheel 9 in such a manner that the peripheries of the wheels lie adjacent at the point 12, as shown. Beyond these wheels 8 and 9 there is arranged another pair of wheels 13 and 14, respectively, which are supported upon the frame 1 in a similar manner, axles 15 and 16 being employed for this purpose in conjunction with suitable bearings 17. These wheels are disposed in a manner very similar to that of the aforesaid wheels 8 and 9, the wheel 13 being disposed substantially vertically above the wheel 14, as shown, the peripheries of the wheels being nearly in contact at the point 18. It should appear, however, from an inspection of Fig. 2 that these wheels are not disposed in alinement with the aforesaid wheels 8 and 9, but are displaced a small amount to one side of the same. This arrangement is adopted for a purpose which will appear hereinafter.

Substantially opposite to the wheels 8 and 9 there is mounted upon the frame 1 a crank-shaft 19, which is suitably supported in bearings 20. This crank-shaft comprises a crank-pin 21, which passes rotatably through a head 22, which head constitutes the lower extremity of a comb-handle 23, and this comb-handle terminates below in a comb 24, as shown. The upper extremity of the comb-handle 23 is attached by means of a pivot-pin 25 to a guide-stem 26, which guide-stem passes through a vertical bore in a guide-block 27, disposed above the said comb, as shown.

A crank-shaft 28, which is similar to the aforesaid crank-shaft, is provided in conjunction with the wheels 13 and 14 and disposed oppositely to the same much in the same manner as the crank-shaft 19 is disposed oppositely to the wheels 8 and 9, and this crank-shaft carries a comb 29, which is substantially similar to the aforesaid comb and carried in the same manner at the lower extremity of the handle 30, which handle is connected as before with a stem 31, the said stem being vertically guided in a guide-block 32, arranged for the purpose, in a manner similar to the guide-block 27.

Before proceeding to a more minute description of the mechanism it should be stated at this point that arrangement is made for feeding the bristles to be treated, so that they pass successively between the wheels 8 and 9 and the wheels 13 and 14 in such a manner that they are held at one end by the wheels 8 and 9 and then at the other end by the wheels 13 and 14. When the bristles are being held between the wheels 8 and 9, the crank-shaft 19 is rotated in such a manner as to pass the comb 24 successively through the bristles. When the bristles are being held at their opposite extremities by the wheels 13 and 14, the comb 29 is passed through the bristles in a manner similar to that described. In this way the individual bristles are straightened out or combed, so that they are disposed in the same direction.

Arrangement is made for driving the wheels 9 and 14. This is effected by means of gear-wheels 33 and 34, which are rigid, respectively, with the axles of the said wheels, as will be readily understood, these gears being arranged so that they mesh, respectively, with gears 35 and 36, disposed between them. These latter gears 35 and 36 are rigidly mounted upon a transversely-disposed shaft 37, carrying a worm-wheel 38, which worm-wheel is driven by means of a worm 39, suitably mounted upon a shaft 40, the said shaft 40 being driven by means of a belt 41, which passes over a pulley 42, arranged for this purpose. The belt 41 passes over a belt-pulley 43, which is carried upon or near the extremity of a horizontal shaft 44, disposed longitudinally with respect to the frame 1, and rotatably mounted in bearings 45, arranged upon the aforesaid extensions 6. This main shaft 44 is driven by means of a suitable belt 46 and pulley $46^a$, as indicated. The aforesaid crank-shafts 19 and 28 are also driven from the main shaft 44 by means of belts 47, passing around pulleys 48 and 49, carried, respectively, by the main shaft and the crank-shafts. From this arrangement it should appear that the combs 24 and 29 may be actuated, while the wheels 9 and 14 are driven simultaneously in the same direction. It should be understood that during the operation these wheels rotate in the direction indicated by the arrows.

In their general construction the wheels 8, 9, 13, and 14 consist, substantially, of disks provided with peripheral rims or tires 50, which extend radially a very appreciable amount, as shown, but which are of a width somewhat less that the width of the bodies of the disks, as indicated. These tires 50 are provided with peripheral grooves 51, which are for a purpose which will appear more clearly hereinafter. However, it may be stated at this point that these grooves are intended to receive certain cords which are instrumental in advancing the bristles and in guiding them in their grooves when under treatment by the mechanism and when being returned after such treatment. The tires 50 are preferably of rubber or similar elastic impressionable material.

The parts for the purpose just mentioned will now be described. The table 7, referred to above, comprises a top 52, which is disposed in a general horizontal direction from the frame 1. It is, however, inclined in a direction transversely of the machine, as indicated in Fig. 4. Upon its upper side there is arranged a guide-plate 53, which is disposed longitudinally with respect to the same, and which carries brackets 54, having elongated adjusting-slots 55, which coöperate with bolts 56 for the purpose of effecting the lateral adjustment of the plate, as will be readily understood. Upon its upper side the central line of this top or cover 52 is substantially in horizontal alinement with the points 12 and 18, which, it will be remembered, are the points of contact between the wheels 8 and 9 and the wheels 13 and 14, respectively, and it should be stated that between the coöperating pairs of wheels there is provided a horizontal shelf 57, the upper side of which is also substantially in alinement with the points 12 and 18, as shown. At its extremity remote from the frame 1 the said table 7 is provided with bearings 58, in which is mounted a shaft 59, which carries rigidly the grooved pulleys 60 and 61, and at the edge of the aforesaid shelf 57, remote from the table 7, there is mounted a guide-pulley 62, which is in alinement with the aforesaid pulley 61, and both these pulleys 61 and 62 are in alinement with the plane of the wheels 8 and 9. A cord 63, preferably of suitable vegetable material, such as hemp, passes around the pulley 61, extends longitudinally along the top 52 of the table, passes in a groove 51 between the tires 50 of the wheels 8 and 9 and over the pulley 62 aforesaid. From the pulley 62 the aforesaid cord passes in an inclined direction downwardly and passes around the under side of the wheel 9, being disposed in the groove 51 of this pulley in the manner shown, beyond which it has an upwardly-inclined portion 65, after which it passes longitudinally under the cover 52 of the table, pasing over guide-pulleys 66, disposed beneath the cover, as shown. At the inner end of the table 7 and adjacent to the said frame 1 there is mounted a pulley 67, which is disposed in alinement with the aforesaid pulley 60, and a cord 68 passes around these pulleys, as shown, its upper side lying upon the cover 52, its lower side being disposed below the cover, as shown. From this arrangement it should appear that if the wheel 9 were rotated in the direction of the arrow it would operate to advance toward it that portion of the cord 63 lying upon the table-top 52, and since the pulley 60 is rigid with the pulley 61 the rotation of the wheel 9 would also operate to advance the cord 68 along the table toward the wheel 9. In the practical operation of the machine a mat of bristles 69 is placed upon the cover 52, so that the body of the bristles is disposed transversely of the table and so that the bristles lie upon the said cords 63 and 68. Now when the wheel 9 is rotated these bristles are advanced toward it, and eventually their extremities which lie adjacent to the wheel are clamped between it and the wheel 8 in a manner which has been described above, at which time the comb 24, which operates in conjunction with these wheels, combs out the bristles. After leaving the point 12, at which this combing takes place, the bristles are advanced toward the wheels 13 and 14 by arrangements very similar to those just described for advancing the bristles to the wheels 8 and 9. It should be stated that the portion of the cord 63 which extends beyond the wheel 9 is instrumental in effecting this purpose. This cord coöperates with another cord 70, which cord passes around the periphery of the wheel 14, as shown, whence it passes upwardly and around a guide-pulley 71, which is in substantial alinement with the groove in the tire of the wheel 14, as will be readily understood. Now it should be stated that after leaving the wheel 9 the bristles rest upon and are advanced by the cords 63 and 70, the cord 70 having replaced the cord 68. Passing onto the wheels 13 and 14 the extremities of the bristles which were adjacent to the guide-plate 53 are held between the wheels, while the comb 29 operates upon them in the same manner as the comb 24.

Arrangements for effecting the return of the bristles to the table 7 will now be described. In this connection it should be observed that the said table 7 comprises a lower shelf $71^a$, which is disposed horizontally below the cover 52. The upper side of this shelf $71^a$ is in substantial alinement with the upper sides of guide-pulleys 72, $72^a$, and 73, which are disposed, as shown, and arranged at the remote and inner ends of the said shelf. These pulleys or rollers 72 and 73 are connected, respectively, with a third depressed pulley 74 by continuous cords 75 and $75^a$ in the manner shown. The pulley $72^a$ is rigidly mounted upon the same axle with the pulley 72 and is connected by a continuous cord $75^b$ with the pulley $72^b$, which latter pulley is disposed at the inner end of the table 7 and adjacent to the roller 73, as shown in Fig. 8. This cord $75^b$ is in substantial alinement with the cord $75^a$. At that side of the frame opposite to the table 7 there is provided a roller or pulley 76, which is disposed oppositely to and at the same height as the roller 74, and over these rollers 74 and 76 two cords 77 pass, which cords pass continuously about the pulleys, as will be readily understood. Between these pulleys there is arranged a horizontal shelf 78, which is disposed in such a manner that the upper runs of the cords 77 rest upon the same. It should be observed that the cords 77 are disposed quite close together, and where these cords pass about the roller 74 they pass between the aforesaid cords 75 and $75^a$. Arrangement is made for driving the roller 76. For this purpose the aforesaid shaft 16 is provided with a belt-pulley 79, which connects by means of a cross-belt 80 with the belt-pulley 81, carried by the shaft 82 of the roller 76, so that the rotation of the wheel 14 when driven by the gear 36 would be transmitted to the roller 76, as will be readily understood. Of course the roller 76 drives the roller 74 by reason of the cords 77, and the roller 74 drives the two cords 75 and 75ª, as will be readily understood.

Arrangement is made for delivering the bristles upon the extremity of the shelf 78 remote from the table 7, the bristles being delivered at this point upon the cords 77, so that the movement of the cords in the direction of the arrow will initiate a return of the bristles toward the table 7. Referring especially to Figs. 1, 7, and 10, the arrangement will be described for conveying the bristles from the second comb to the shelf 78. For this purpose there is employed a shield or guide 83, which is disposed about the outer edge of the wheel 14, conforming substantially to the curved outline of the same. In this manner the shield constitutes substantially half of a circumference. Its lower extremity is cut away at 78ª for the cords 77 and is attached tangentially, as shown at 84, with the upper side of the shelf 78. Its upper extremity lies near the comb 29 and is bent or formed into a lip 85, intended to be instrumental in facilitating the passage of the bristles under the shield. At each side of the shield there are provided, respectively, curved springs or guides 86, which also conform substantially to the outline of the wheel 14, the same being disposed upon a circumference of smaller diameter than that of the shield 83. In this manner guide-spaces 87 are formed between the springs and the aforesaid shield. It should appear that at their lower extremities these springs 86 attach substantially tangentially upon the under side of a cover-shelf 88, which is horizontally disposed above the aforesaid shelf 78. The upper extremities of the springs 86 are attached to stubs 88, which have a limited rotation for the purpose of reducing or increasing the length of the springs 86, so as to effect necessary adjustments in the width of the guide-spaces 87, as will be readily understood. Cranks 89 may be employed in this connection. The arrangement of the parts just described is shown in Fig. 12. Now when the bristles leave the wheels 13 and 14 they pass under the lip 85 into the guide-spaces 87, and by reason of the movement of the wheel 14 they pass with the periphery of this wheel downwardly until they eventually are delivered upon the shelf 78, so that they will lie upon the aforesaid cords 77. The movement of the cords 77 then causes their advance in a direction to return them to the table 7. When the edge of the shelf 78 is reached adjacent to the roller 74, the bristles are received upon the cord 75ª and the portion 90 of the cord 75. Under these cords there is disposed an inclined shelf 91, and when the bristles reach this point they rest upon the said cords and they are held by the portion 65 of the cord 63, which is moving upwardly adjacent to the face of the inclined shelf, as will be readily understood.

In this manner the bristles are carried up to the level of the shelf 71, and when they arrive at this level they are carried along toward the outer extremity of the table by reason of the continued movement of the cords 70 75 and 75ᵇ. In this way the bristles are eventually delivered in a well-arranged mat 92, as indicated in Fig. 3.

Arrangement is made for bringing into alinement as far as possible the extremities of the bristles before they pass to the combs 24 and 29. For this purpose above the upper side of the top 52 of the table 7 there are provided a pair of oppositely-disposed shuffle plates or guides 93 and 94. These shuffle-guides are disposed parallel with each other, as shown, and the guide 94 is disposed so as to constitute a continuation of the aforesaid guide 53. It should be understood that these shuffle-guides 93 and 94 are disposed at a distance apart which would depend upon the length of bristles which were being treated. For this purpose their inner extremities are pivotally carried at 95 upon laterally-disposed stems 96, which stems are adjustably mounted in brackets 97, carrying set-screws 98 for securing the same. It should be understood that these shuffle-guides are moved continuously from side to side during the operation, and in order to facilitate the entrance of the bristles between them their outer extremities are flared or inclined outwardly, as shown at 99. The mechanism for continuously moving these shuffle-guides includes eccentrics 100 and 101, the rods 102 of which connect with arms 103, which arms are carried, respectively, by vertically-disposed rock-shafts 104, mounted in bearings 104ª, and to these rock-shafts are rigidly attached arms 105, which connect, by means of links 106, with the shuffle-plates near their outer extremities, as indicated.

At this point it may be stated that the purpose of the possible lateral adjustment of the shuffle-guides 93 and 94 is to enable bristles of various lengths to be treated.

In order to adjust the point of application of the combs 24 and 29 and to effect their mode of operation, the aforesaid guide-blocks 27 and 32, which were described in connection with them, are mounted in horizontally-disposed transverse members 107, the same being provided with longitudinal openings or slots 108, in which the said blocks are mounted in the manner shown. It should be understood that these guide-blocks would be secured in any desired position by means of set-screws 109 or similar devices.

Describing more fully the mode of operation of the machine, it may be stated that a mat of unprepared bristles is placed upon the cover 52 of the table 7, the same being arranged with their ends lying against the guide-plate 53, their bodies being disposed across and resting upon the cords 63 and 68, which cords move longitudinally of the table, as will be remembered, when the machine is in operation. The movement of these cords advances the mat of bristles toward the combing mechanism. It should be stated that from the fact that the cover 52 is inclined, as shown, there is a tendency for the bristles to arrange themselves with their extremities more nearly in alinement as the cords 63 and 68 advance them. As the bristles leave the inner extremity of the guide-plate 53 they come under the influence of the shuffle-guides 93 and 94, which, it will be remembered, are continuously moving laterally in such a manner as to shuffle the bristles between them more nearly into alinement with each other. After the bristles pass from the rear of these shuffle-guides they pass between the wheels 8 and 9, and at the point 12 between these wheels they are held at their extremities. While held in this manner the comb 24 is passed through the bristles, in this way carrying on the operation of arranging the bristles. After the bristles pass from this point they are carried by the cord 70 and the cord 63 in such a manner as to pass between the wheels 13 and 14 in the same manner as they passed between the wheels 8 and 9; but these wheels operate to hold the bristles at their opposite extremities, whereupon they are operated upon by the comb 29 in the same manner as the comb 24. The mode of operation of these combs should be readily understood, as it should appear that their cranks are driven so that the combs operate upon the bristles in the upper portion of their revolution and pass downwardly adjacent to the point at which the bristles are clamped, so that the teeth of the comb pass through the bristles. When the bristles leave the wheels 13 and 14, they pass under the shield 83, being impelled by the periphery of the wheel 14. In this manner they are carried between the shield 83 and springs 86, which are provided at each side of the wheel, so that they are eventually delivered upon the lower shelf 78, where they are placed upon the constantly-moving cords 77, which begin to return the bristles toward the table 7, the bristles passing along the shelf 78 until they are delivered to the cords 75 and 75ª, which move upwardly along the inclined shelf 91. The progress of the bristles at this inclined shelf is assisted by the portion 65 of the cord 63, which lies just above the shelf, in such a manner that the bristles are held between the same, as will be readily understood.

It should be understood that the operator sits near the table and takes the bristles as delivered from the lower shelf and returns them to the upper shelf or cover of the table, so that they may be passed and repassed through the machine as often as desired.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. In a machine of the class described, in combination, a table, means for advancing a mat of bristles thereupon, said table being inclined laterally to the direction in which said bristles advance, a guide-plate carried by said table and disposed in the direction in which said bristles advance, a shuffle-plate in substantial alinement with said guide-plate and having a substantially vertical pivot, a second shuffle-plate opposite to the first and having a substantially vertical pivot, means for simultaneously reciprocating said shuffle-plates upon said pivots, and means for varying the distance between said pivots.

2. In a machine of the class described, in combination, a pair of oppositely-disposed wheels the peripheral faces whereof lie adjacent, a second pair of wheels substantially similar to the first and substantially similarly disposed, an endless belt passing between the peripheral faces of said first pair of wheels, and having a portion passing around the periphery of one of the members of said first pair of wheels, a second endless belt adjacent to said first endless belt and constituting therewith a conveyer adapted to receive a mat of bristles, means for advancing said bristles from said first pair of wheels to said second pair of wheels, and combs coöperating with said wheels.

3. In a machine of the class described, in combination, a pair of oppositely-disposed wheels the peripheral faces whereof lie adjacent, a second pair of wheels substantially similar to the first and substantially similarly disposed, an endless belt passing between the peripheral faces of said first pair of wheels and over a portion of the periphery of one of said wheels, said belt extending to a point adjacent to said second pair of wheels, a second endless belt coöperating with said first endless belt to constitute a conveyer for advancing a mat of bristles to said first pair of wheels, a third endless belt passing between the peripheral faces of said second pair of wheels and extending from a point adjacent to said first pair of wheels, and coöperating with a portion of said first endless belt to constitute a conveyer adapted to advance said mat of bristles to said second pair of wheels, and combs coöperating with said wheels.

4. In a machine of the class described, in combination, a pair of oppositely-disposed wheels the peripheral faces whereof lie adjacent, a second pair of wheels substantially similar to the first and substantially similarly disposed, means for driving said wheels, and continuous endless belts passing respectively between the surfaces of said wheels and passing around said wheels, said endless belts being instrumental in advancing a mat of bristles to said wheels, and combs coöperating with said wheels.

5. In a machine of the class described, in combination, a pair of oppositely-disposed wheels the peripheral faces whereof lie adjacent, a second pair of wheels substantially similar to the first and substantially similarly disposed, an endless belt passing between the surfaces of said first pair of wheels and passing about one of the wheels of said first pair, a second endless belt passing between the surfaces of said second pair of wheels and passing around the periphery of one of the wheels of said second pair, other continuous belts coöperating with said first belts to constitute a conveyer adapted to advance a mat of bristles, said wheels being adapted to hold a portion of said mat of bristles, and combs coöperating with said wheels.

6. In a machine of the class described, in combination, a pair of oppositely-disposed wheels the peripheries whereof lie adjacent, a second pair of wheels substantially similar to the first and substantially similarly disposed, endless belts adapted to advance a mat of bristles so as to pass the same between said wheels, a support between said pair of wheels across which said mat may pass, and combs coöperating with said wheels.

7. In a machine of the class described, in combination, a wheel, a member coöperating therewith and having a surface lying adjacent to the periphery of said wheel, a cord passing between said wheel and said member, means for driving said cord, a second cord disposed substantially parallel with said first cord, and extending to a point adjacent to said wheel, means for advancing said first cord, means for driving said second cord through said first cord, and a comb coöperating with said wheel.

8. In a machine of the class described, in combination, means for supporting a mat of bristles, a wheel, a member having a surface lying adjacent to the periphery of said wheel, means for causing a relative longitudinal movement between said mat and said wheel whereby a portion of said mat may be held between the periphery of said wheel and said member, and a comb coöperating with said wheel.

9. In a machine of the class described, in combination, a pair of oppositely-disposed wheels, a second pair of oppositely-disposed wheels, a cord passing between the adjacent surfaces of said first pair of wheels and extending to a point adjacent to said second pair of wheels, a second cord coöperating with said first cord and extending to a point adjacent to said first pair of wheels, a third cord extending from a point adjacent to said first pair of wheels and passing around the periphery of one of the wheels of said second pair, said first cord passing around the periphery of one of the wheels of said first pair, said cords constituting a conveyer for a mat of bristles, and combs coöperating with said wheels.

10. In a machine of the class described, in combination, a pair of wheels, members coöperating with the peripheries thereof, cords passing between the said wheels and said members, said cords passing about the peripheries of said wheels whereby said wheels afford means for advancing said cords, a rotatable member between said wheels and adapted to drive them both, means for driving said rotatable member, and combs coöperating with said wheels.

11. In a machine for treating bristles, conveying mechanism for the bristles, comprising, in combination, a wheel, a guide disposed adjacent to the periphery thereof and conforming substantially to the outline of said periphery, and members disposed at each side of said wheel conforming substantially to the shape of said guide and lying adjacent thereto.

In witness whereof I have hereunto set my hand in the presence of two witnesses.

PIERRE TREPANIER.

Witnesses:
FRANCIS GRAREL,
MICHEL GOULETTE.